(12) United States Patent
Salman et al.

(10) Patent No.: US 9,030,415 B2
(45) Date of Patent: May 12, 2015

(54) SHARED INPUT KEY METHOD AND APPARATUS

(75) Inventors: Majeed D. Salman, Redmond, WA (US); G. Eric Engstrom, Kirkland, WA (US); Peter Zatloukal, Kirkland, WA (US)

(73) Assignee: Varia Holdings LLC, Brooklyn, NY (US)

( * ) Notice: Subject to any disclaimer, the term of this patent is extended or adjusted under 35 U.S.C. 154(b) by 1887 days.

(21) Appl. No.: 10/563,772

(22) PCT Filed: Jul. 9, 2004

(86) PCT No.: PCT/US2004/022150
§ 371 (c)(1),
(2), (4) Date: Jan. 4, 2006

(87) PCT Pub. No.: WO2005/008412
PCT Pub. Date: Jan. 27, 2005

(65) Prior Publication Data
US 2006/0244727 A1 Nov. 2, 2006

Related U.S. Application Data

(60) Provisional application No. 60/486,553, filed on Jul. 9, 2003.

(51) Int. Cl.
*G06F 3/02* (2006.01)
*G06F 3/023* (2006.01)
*G06F 3/0346* (2013.01)
*G06F 3/042* (2006.01)
*H04M 1/22* (2006.01)

(52) U.S. Cl.
CPC ............ *G06F 3/0233* (2013.01); *G06F 3/0426* (2013.01); *G06F 3/0202* (2013.01); *G06F 3/0219* (2013.01); *G06F 3/0346* (2013.01); *H04M 1/22* (2013.01); *H04M 2250/12* (2013.01); *H04M 2250/70* (2013.01)

(58) Field of Classification Search
USPC ......................................................... 345/173
See application file for complete search history.

(56) References Cited

U.S. PATENT DOCUMENTS

| 5,347,295 | A  | * | 9/1994  | Agulnick et al. | 345/156 |
|-----------|----|---|---------|------------------|---------|
| 6,538,636 | B1 | * | 3/2003  | Harrison         | 345/156 |
| 6,670,894 | B2 |   | 12/2003 | Mehring          |         |
| 6,697,054 | B1 | * | 2/2004  | Kamizono         | 345/168 |
| 6,888,532 | B2 | * | 5/2005  | Wong et al.      | 345/156 |

(Continued)

FOREIGN PATENT DOCUMENTS

| WO | 0131788 A1 | 5/2001 |
| WO | 03017244 A1 | 2/2003 |

OTHER PUBLICATIONS

Supplementary European Search Report mailed Feb. 5, 2008 in EP Application No. 04777979.3.

*Primary Examiner* — Kumar Patel
*Assistant Examiner* — Randal Willis
(74) *Attorney, Agent, or Firm* — Schwabe, Williamson & Wyatt. P.C.

(57) ABSTRACT

A method and apparatus for facilitating input of data to an electronic device using overlaid inputs is disclosed. A determination is made as to which of a plurality of terminating hand members is being used to activate a key. A first character value is assigned to an activation of the key, based at least upon the determination.

11 Claims, 10 Drawing Sheets

(56) References Cited

U.S. PATENT DOCUMENTS

| | | |
|---|---|---|
| 6,956,564 B1 * | 10/2005 | Williams ................. 345/179 |
| 6,961,912 B2 * | 11/2005 | Aoki et al. ............... 715/863 |
| 2002/0005837 A1 | 1/2002 | Thomason et al. |
| 2002/0140582 A1 | 10/2002 | Ye |
| 2003/0048260 A1 * | 3/2003 | Matusis ................... 345/173 |
| 2003/0193478 A1 | 10/2003 | Ng et al. |
| 2003/0201982 A1 | 10/2003 | Iesaka |

* cited by examiner

Figure 1 – Prior Art

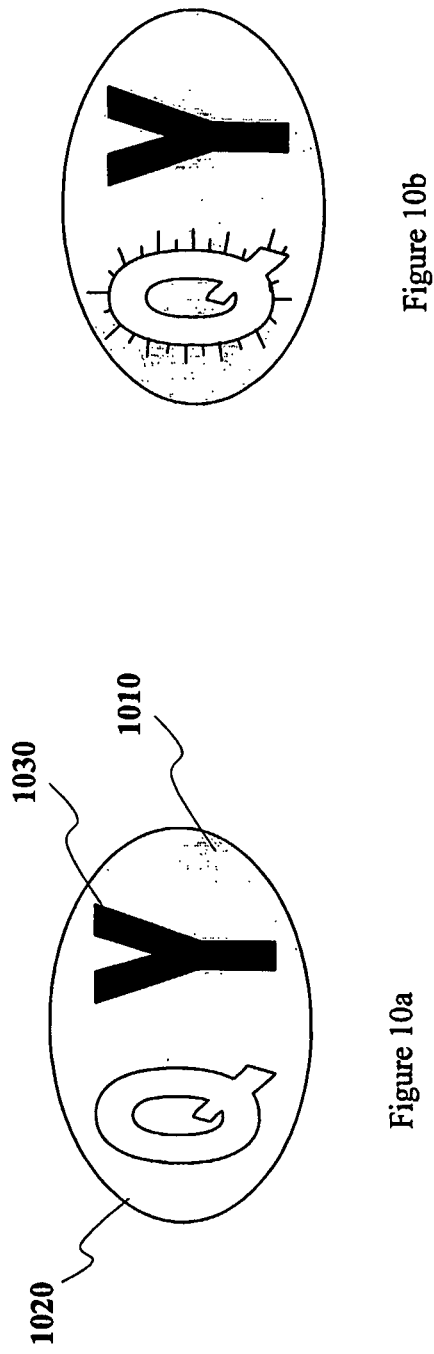
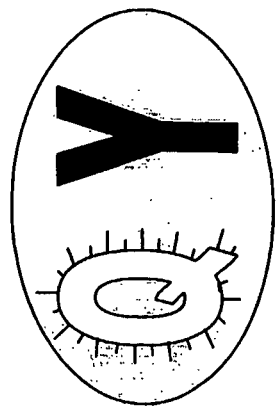
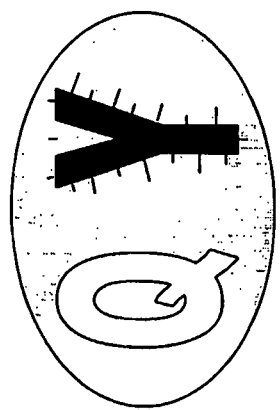
Figure 10a
Figure 10b
Figure 10c

SHARED INPUT KEY METHOD AND APPARATUS

RELATED APPLICATION

The present application claims the benefit of U.S. Provisional Patent Application No. 60/486,553, filed on Jul. 9, 2003, entitled SHARED INPUT KEY METHOD AND APPARATUS. The subject matter of the foregoing application is fully incorporated herein by reference.

FIELD OF THE INVENTION

The present invention relates to the field of electronic devices. More specifically, the present invention relates to the design of an input mechanism for use in portable electronic devices.

BACKGROUND OF THE INVENTION

Portable electronic devices have become ubiquitous in today's fast paced society. Various portable electronic devices provide functions from simple personal digital assistant functionality to in-the-field electronic devices which include real-time, high-speed data transfer for use by such professionals as building inspectors and peace officers. All of these devices have in common the need to provide a user with a friendly interface to facilitate the user's provision of information to the device, and/or systems coupled to the device.

Frequently the small nature of these portable electronic devices has provided challenges in providing a user with a friendly interface. Users of traditional, non-portable electronic devices have utilized electronic devices that reside in a wall rack or on a desktop. These traditional devices frequently contained a terminal and an associated standard QWERTY keyboard. This standard QWERTY keyboard was the primary method for providing input to these traditional electronic devices. Thus, users have become familiar with providing input to electronic devices utilizing a QWERTY keyboard interface.

In contrast with standard QWERTY keyboards in use with desktop and larger computers, miniaturized QWERTY keyboards for inputting data to portable electronic devices typically have a reduced key set. For example, typically, on these miniaturized QWERTY keyboards, the top row of number keys present on a standard QWERTY keyboard, are not present. This reduction in the number of keys present on the QWERTY keyboard is in an attempt to allow the keyboard to fit on the limited surface area of most portable electronic devices.

FIG. 1 illustrates a prior art, to-scale portable electronic device 100 utilizing a miniaturized QWERTY keyboard 110 for inputting data. Various factors may affect the surface area available for the keyboard. As will be appreciated, most portable electronic devices are compact to allow ease of transport by a user in a pocket or personal carrying device. In addition to the compactness of the device, a significant portion of the surface area that does exist is allocated to a display device 120 for display of text and graphics 125. This compactness and maximization of the display device 120 has led to the miniaturization of the surface area available for input keyboards such as a miniaturized QWERTY keyboard 110.

This reduction in surface area for input keyboards has come while trying to maintain full alphanumeric input capability. These competing requirements have resulted in a reduction in input key size as well as a reduction in spacing between input keys. Referring again to FIG. 1, note the relative size of the input keys 162 and the spacing between keys 164. This reduction in key size and spacing can make the use of keys on the miniaturized QWERTY keyboard 110 difficult. Frequently users will press keys inadvertently due to the close proximity and size of the keys. This affects the ability of a user to input data to the portable electronic device.

To overcome the limitations of providing input via keyboards, other user interface options have been developed. These other options for inputting data to portable electronic devices include voice recognition units. Historically however these voice recognition devices have not proven to be reliable. This unreliability is due to a number of factors. Background noise in an environment containing the portable electronic device can prevent proper recognition by the device of a command from the user. This background noise interferes with the ability of the speech recognition device to correctly discern the spoken word of a user. Other problems include being able to successfully associate specific vocalizations with specific phonemes which can vary among users based on age, gender and culture.

BRIEF DESCRIPTION OF THE DRAWINGS

FIGS. 10A-10C illustrate a key accommodating multiple character values, in accordance with one embodiment.

DETAILED DESCRIPTION OF THE PREFERRED EMBODIMENTS

Parts of the description will be presented in terms such as portable electronic devices. As well understood by those skilled in the art, the term "portable electronic device" as used herein (hereafter, simply "electronic device"), including in the claims, comprise wireless mobile phones, personal digital assistants (PDAs), and other devices of the like.

The term "wireless mobile phone" as used herein refers to the class of telephone devices equipped to enable a user to make and receive calls wirelessly, notwithstanding the user's movement, as long as the user is within the communication reach of a service or base station of a wireless network service provider. Unless specifically excluded, the term "wireless mobile phone" is to include the analog subclass as well as the digital subclass (of all signaling protocols).

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may.

The terms "comprising", "having" and "including" are synonymous, unless the context dictates otherwise.

The phrase "terminating hand members" is intended to indicate a portion of a user hand utilized to activate keys. This includes all five of the fingers, or digits, of the hand including thumb, index finger, middle finger, ring finger and little finger.

The embodiments are described herein with respect to a character set based on the English language. It is to be recognized that the invention may be practiced with alphanumeric data as well as characters of other languages.

While the present invention is described with respect to its improvement over a miniaturized QWERTY keyboard, one skilled in the art will recognized that the present invention may be practiced with respect to other keyboard layouts, such as a miniaturized Dvorak keyboard.

Figure 1:
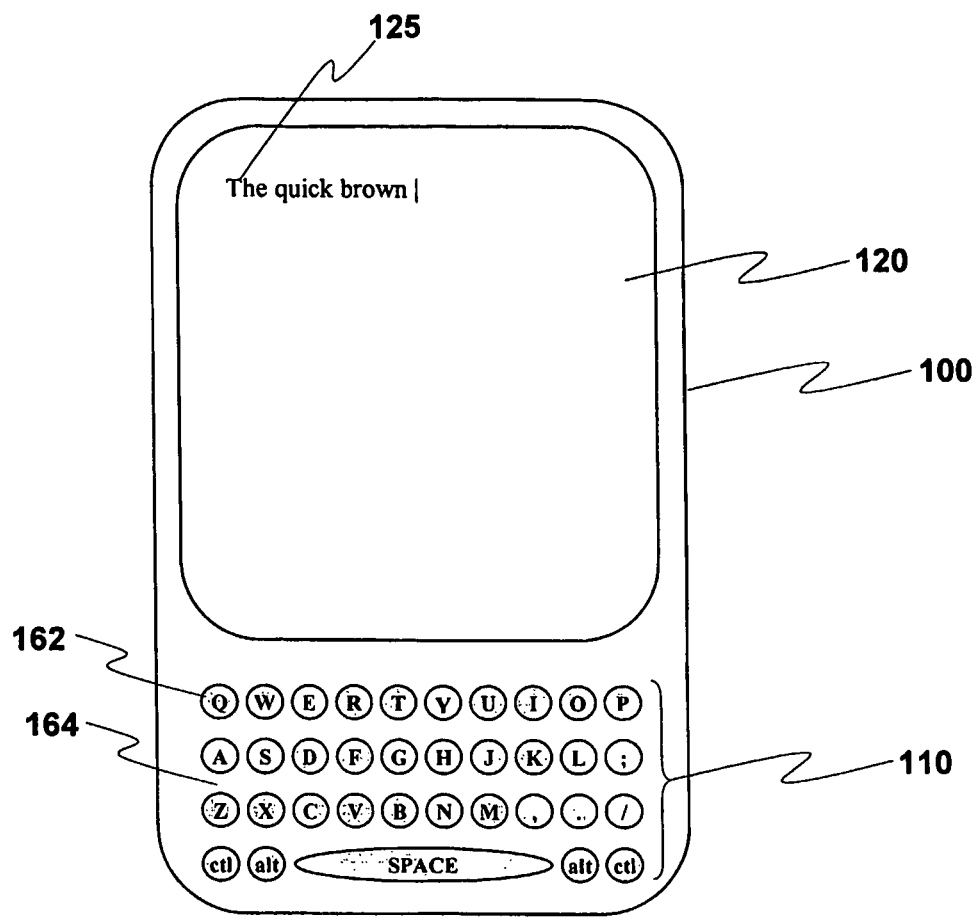
FIG. 1 illustrates a prior art, to-scale portable electronic device utilizing a miniaturized QWERTY keyboard for inputting data.
Figure 2:
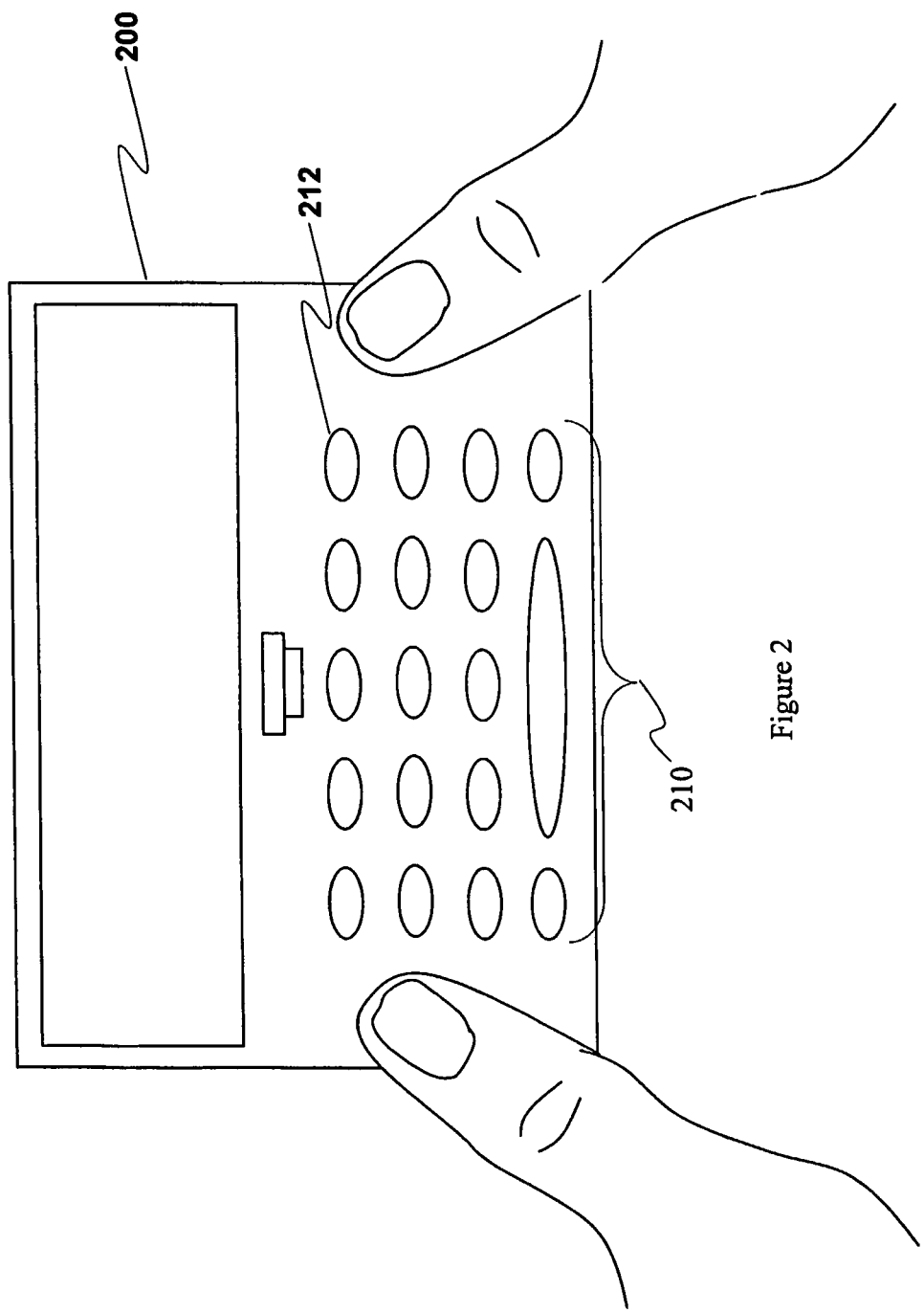
FIG. 2 illustrates an electronic device in accordance with one embodiment of the present invention.

FIG. 2 illustrates an electronic device 200 in accordance with one embodiment of the present invention. The electronic device 200 contains a reduced keyboard 210 for providing character input to the electronic device 200. In accordance with the present invention, each key on the reduced keyboard 210 has associated with it multiple character values, e.g. keys are overlaid with multiple character values. The present invention advantageously allows this association of multiple character values with keys by providing a method of determining which character values will be assigned to various key activations. The terms "character" or "character values" as used herein include all alphanumeric (such as a, b, c . . . , 1, 2, 3 . . . ), punctuation (such as ";", ":" . . . ), symbols (such as "$" . . . ), and so forth, of all languages. However, for ease of understanding, the remaining descriptions and examples will be presented using "characters" of the English language, but it should not be construed as limiting to the invention.

"Activation" means an affirmative action by a user to provide a character value associated with a key as input to the electronic device. Key activations may include a traditional mechanical key that, when pressed, causes the key to contact a switch on a circuit board located beneath the key. Alternatively, key activations may mean the touching by a user of a pressure sensitive key or an electronically sensitive key. Thus, "activation" is to be broadly interpreted.

The reduced keyboard 210 advantageously reduces the number of keys 212 for user input. This allows a given working area to be dedicated to a smaller number of keys than a miniature QWERTY keyboard. As discussed above, when a user tries to key input data on a miniature QWERTY keyboard, an incorrect key can be struck causing erroneous data to be input. Thus, having a keyboard with a reduced number of keys facilitates easier, less error prone user interaction by allowing more area to be dedicated to a key, e.g. have larger keys and/or more space between keys.

The present invention advantageously facilitates detecting which of a user's fingers is used to perform a key press. Upon such a determination, a character value is logically assigned to the key such that, during a subsequent key activation, the assigned character value will be input to the electronic device. In alternate embodiments, the determination and assignment may be performed after activation.

Figure 3:
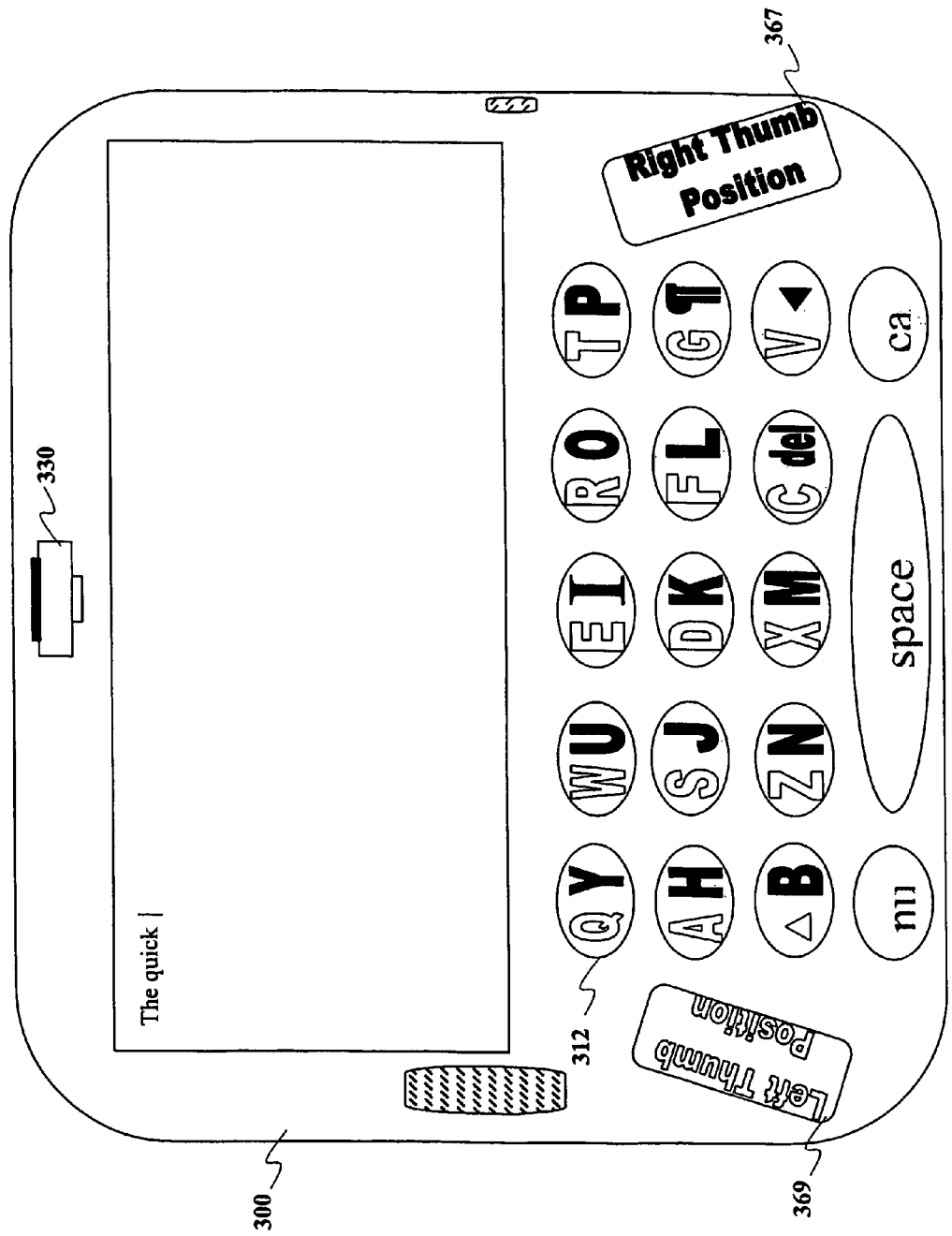
FIG. 3 illustrates an electronic device, in the form of a wireless phone, comprising an activation detection device, in accordance with one embodiment.

Refer now to FIG. 3, which illustrates an electronic device, in the form of a wireless phone 300, comprising an activation detection device 330, in accordance with one embodiment. In this embodiment, each key has associated with it two character values. That is to say that, when a user presses a key on the keyboard, one of the two associated character values will be assigned to the key pressed. In the embodiment shown, the letters printed on the keys indicate these multiple assignments. Thus, for example, key 312 has associated with or assigned to it both a "Q" and a "Y" character.

Electronic device 300 contains an activation detection device 330 to facilitate detection of movement of a user's hands (not shown). By detecting the movement of user's hands, the electronic device 300 can determine which of the two character values associated with a key will be input to the device.

Figure 4:
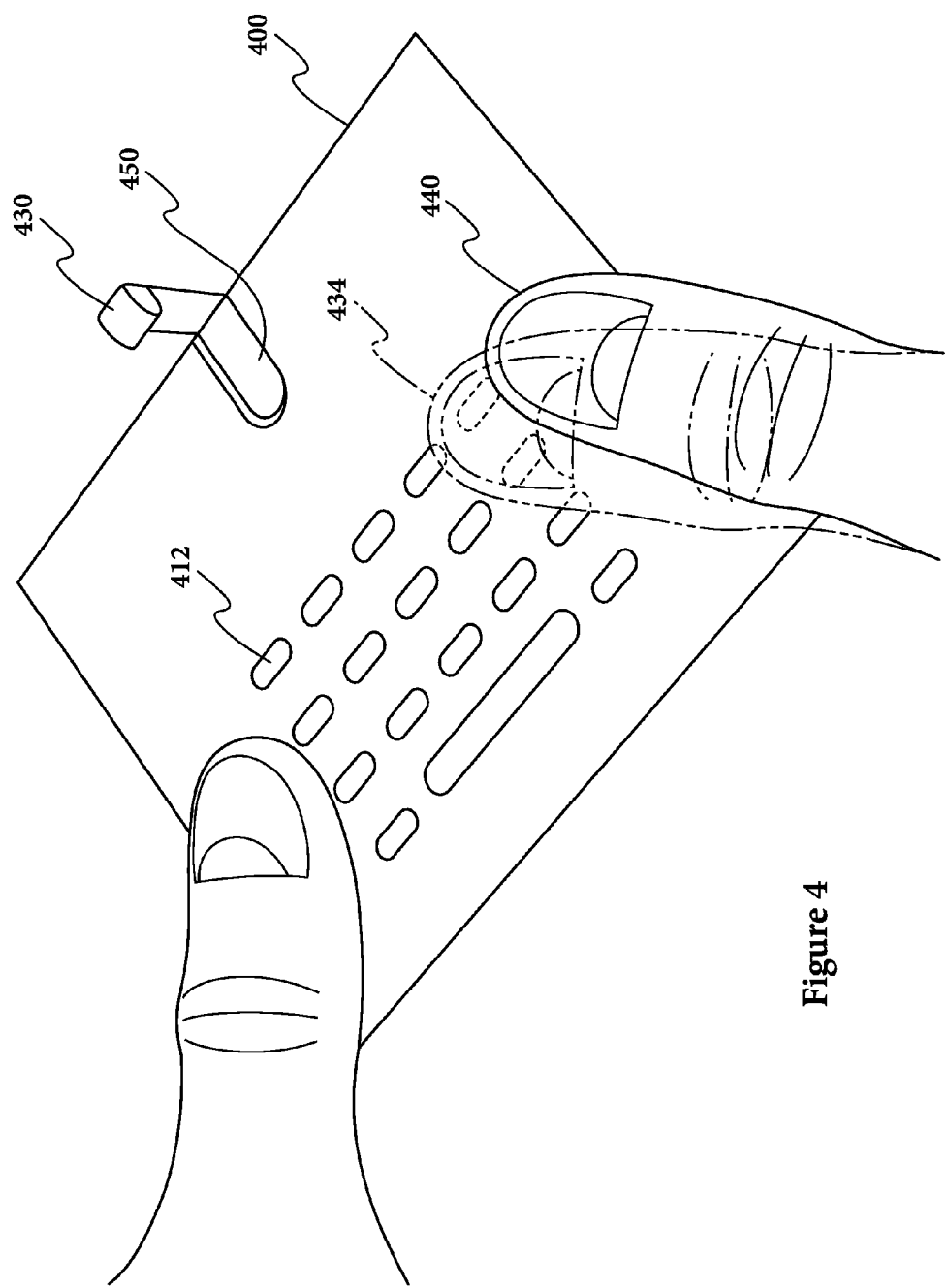
FIG. 4 illustrates an electronic device comprising an activation detection device, in accordance with another embodiment.

FIG. 4 illustrates an electronic device 400 comprising an activation detection device 430, in accordance with another embodiment. In the embodiment shown, the activation detection device comprises a pop-up camera, capable of being stored in a storage well 450 of the electronic device when not in use. In this embodiment, this camera and accompanying software are capable of tracking a user's hand movements. For example, in the embodiment shown, a user's right thumb is in a first position 440 on device 400. Assume the electronic device of FIG. 4 comprises a keyboard similar to the keyboard shown in FIG. 3. Further assume a user wishes to input a "Y" into the electronic device 400. In order to enter a "Y" into the electronic device, the user utilizes the right thumb to activate key 412. As the user moves the right thumb from a first position 440 towards the key 412 to be activated, the activation detection device is utilized to assign a character value to the impending key activation based upon the detected movement of the right thumb between the first position 440 and the second position 434 closer to the key 412 to be activated. In other words, camera device 430 operates as activation detection hardware to facilitate provision of an indication of which of the user's two thumbs will be used to provide input to the electronic device.

As previously mentioned in a prior embodiment, the input keys provide an indication of the multiple character values associated with each key. For example, in the above description, the character value associated with the right thumb, e.g. a "Y" is associated with key 312 if the right thumb is detected in use. However, if it is determined that the left thumb is in motion, then a "Q" is associated with key 312 and an activation of key 312 results in a "Q" being provided as input to the electronic device. Thus, in the embodiment shown, when the right thumb is detected in motion, each key has associated with the character value as shown in solid. Whereas when the left thumb is in motion, each key has associated with it the character value shown in outline. As illustrated the two character values are shown on the keys in black in white. In one embodiment the two character values are shown in different colors, e.g. red for the left thumb values and green for the right thumb values. In such an embodiment, the keys have back lighting capability. Thus, when it is detected that a right thumb is to be used for a key activation, the green color on all keys become back lit. Similarly, when it is detected that a left thumb is to be used for a key activation, the red color on all keys become back lit.

Figure 5:
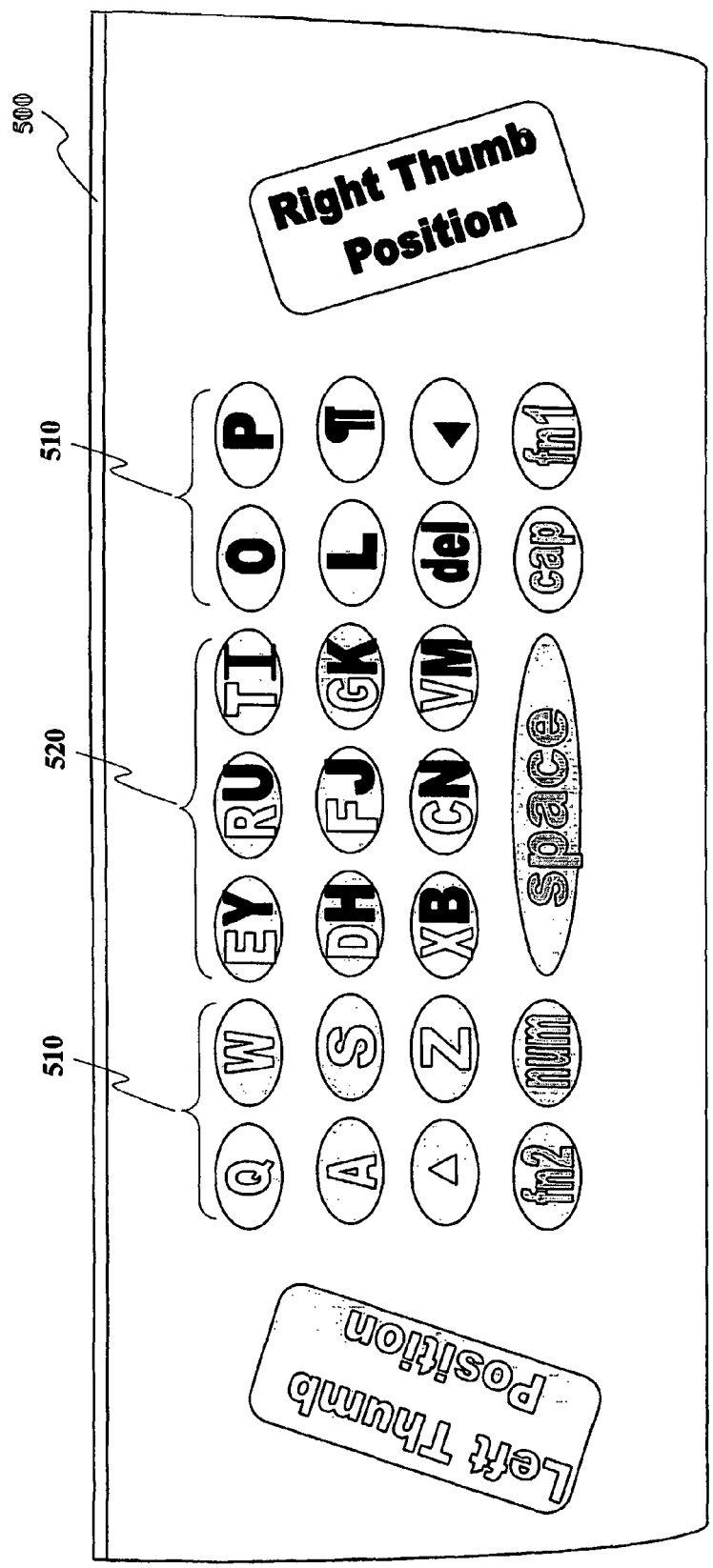
FIG. 5 illustrates keyboard portion of an electronic device, illustrating an alternative keyboard layout, in accordance with another embodiment.

FIG. 5 illustrates keyboard portion 500 of an electronic device, illustrating an alternative keyboard layout in accordance with another embodiment. As with the previous embodiment, the keyboard 500 contains fewer keys than a miniaturized QWERTY keyboard. However, this embodiment only has some of its keys with multiple character values. For example, keys located towards the center of the keyboard 520, and therefore closest to the opposite hand, have two character values associated with them. In contrast, the keys located more towards the periphery of the keyboard 510 have a single character value associated with them. Thus regardless of what hand is utilized to press the periphery keys 510, the character value input to the electronic device will be the same.

In addition to using a camera with motion detection software, to be discussed more fully below, for analyzing the movement of a user's hands, other methods can be utilized to conditionally activate the multiply defined keys. Thus, while fingers are utilized to activate keys, in some cases, hand movements, indicating a user's movement towards a key press, can be detected through other means. For example, as users finger moves closer to a key, pressure on the body in that direction increases.

Figure 6:
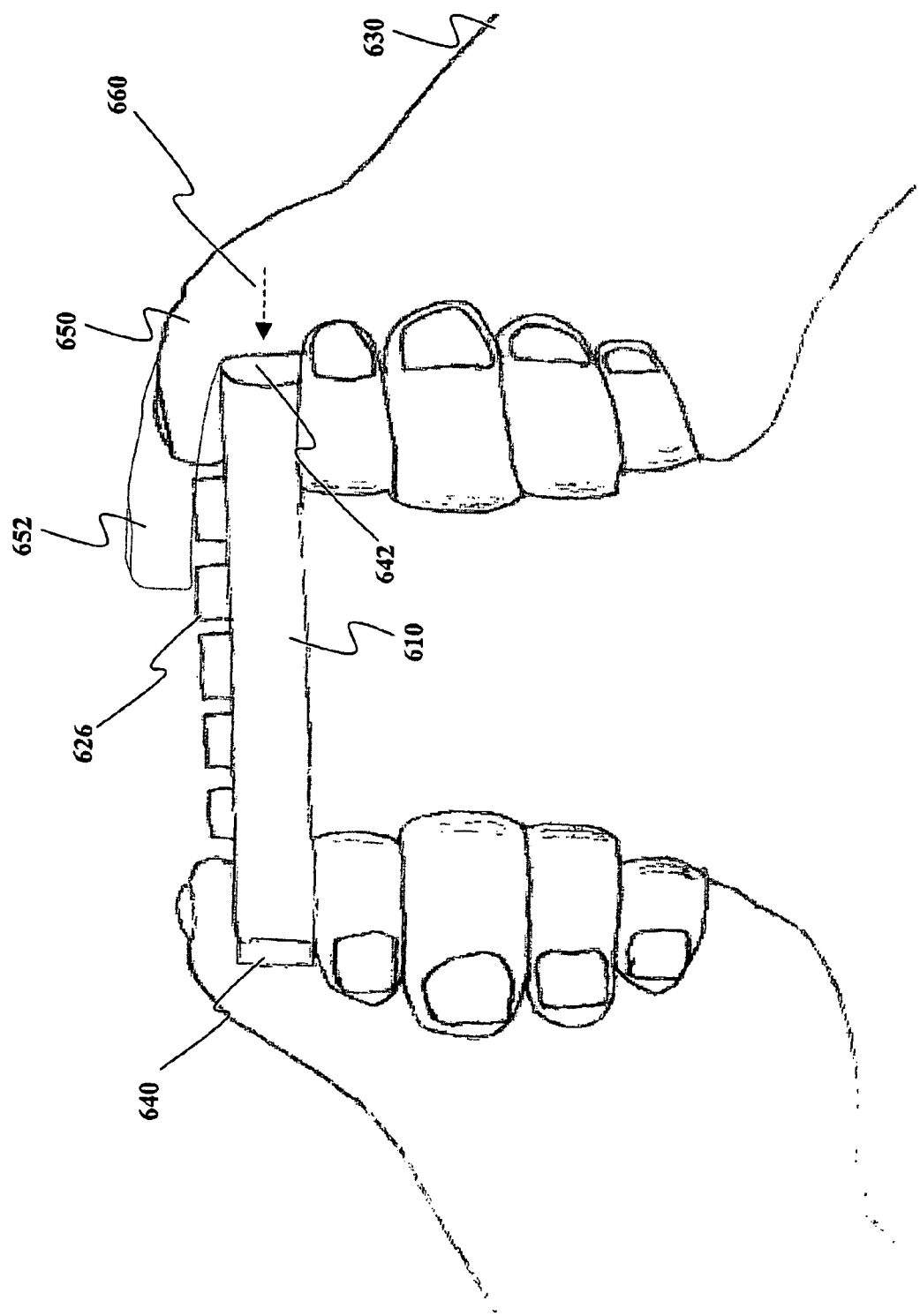
FIG. 6 illustrates an electronic device containing pressure sensors, in accordance with one embodiment.

FIG. 6 illustrates an electronic device containing pressure sensors in accordance with one embodiment. In this embodiment, pressure sensors act as activation detection hardware. An electronic device contains a body 610 and input keys, including input key 626. In addition, pressure sensors 640 642 are integrated to the body 610. These pressure sensors 640 642 are utilized to aid in the detection of a user's terminating hand member in the key activation process. For example, as the right thumb 650, on a user's right hand 630, is moved 652 towards key 626, the user's right hand applies inward pressure 660 to the body 610. This pressure is detected by pressure sensor 642. This increase in pressure is an indication that the right thumb, vis-à-vis the left thumb, will be utilized to depress key 626 thus assigning a particular definition for a key activation of key 626.

In another embodiment, a combination of the relative pressures on two pressure sensors 640 642 can be utilized to provide an indication of the assigned character value to a key to entry to an electronic device upon key activation. For example, a right finger is utilized to press a key 626 and then returns to a non-use position 650. When returning to the non-use position 650 the pressure associated with right sensor 642 will be decreasing. At the same time, a left finger moves toward key 626 to perform a key activation. This movement results in an increase in pressure associated with left sensor 640. This dynamic relationship, increasing pressure on left sensor 640 combined with decreasing pressure on right sensor 642, can also be used to provide an indicia of which one of a plurality of character values corresponding to a key should be associated with a next activation of the key 626.

Figure 7:
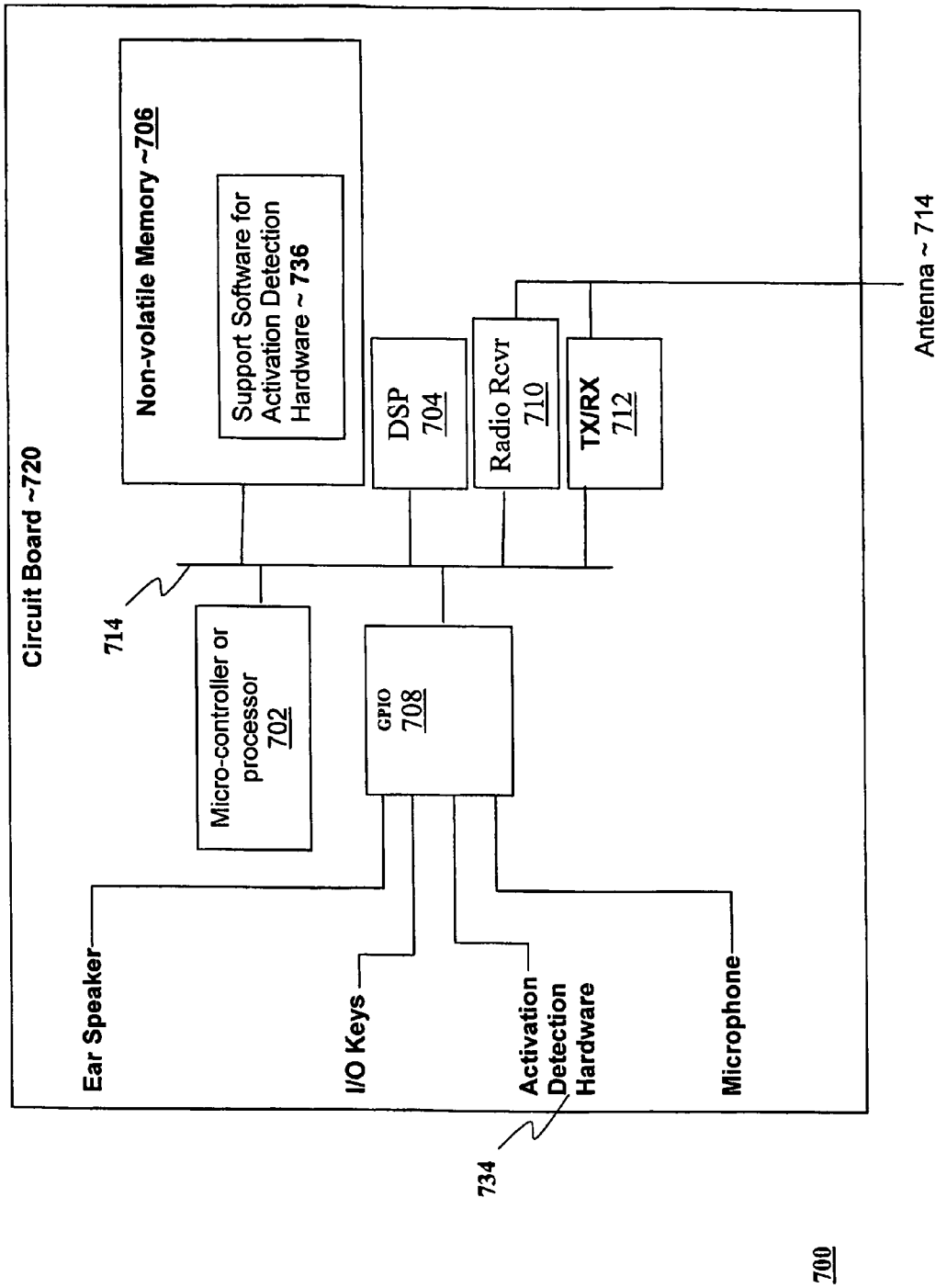
FIG. 7 illustrates the mobile device of FIG. 5 in further detail, in accordance with one embodiment.

FIG. 7 illustrates mobile device 300 in further detail, in accordance with one embodiment. As alluded to earlier, for the illustrated embodiment, electronic device 300 is a wireless mobile phone; however, for other embodiments, electronic device 300 may be other electronic devices, including but not limited to PDAs.

As illustrated in FIG. 7, the core unit of an electronic device 300, in the form of a wireless mobile phone, includes conventional elements, such as micro-controller/processor 702, digital signal processor (DSP) 704, non-volatile memory 706, general purpose input/output (GPIO) interface 708, radio receiver 710, and transmit/receive (TX/RX) 712 (also known as a transceiver), coupled to each other via bus 714, and disposed on a circuit board 720.

The core unit of wireless mobile phone 300 is endowed with activation detection software 736 in support of the activation detection hardware 734, together "activation detection logic". Except for activation detection hardware 734 and associated activation detection software 736 provided to mobile device 300, the relevant operating logic of which will be described more fully below, each of these elements 702-714 performs its conventional function known in the art, and is intended to represent a broad range of such element and its equivalents.

Further, TX/RX 712 may be designed to support one or more of any of the known signaling protocols, including but are not limited to CDMA, TDMA, GSM, and so forth. Moreover TX/RX 712 may be implemented using separate transmitter and receiver.

Accordingly, elements 702-714 will not be further described.

As previously alluded to, in various embodiments, activation detection hardware 734 is aided by activation detection software 736. In an embodiment where the activation detection hardware 734 is a camera, the activation detection software 736 is utilized to analyze image information fed to the activation detection software 736 from the camera. For example, activation detection software is utilized to analyze the movement of a user's hands as discussed above. The camera is utilized to capture temporally adjacent images, such as those of a user's hands. By comparing these temporally adjacent images of a user's hands, the activation detection software can determine which of a user's two hands are utilized in the activation of a key.

By way of example, refer back to FIG. 3. Assume a user has just performed a key press of the "EI" key with the left thumb thus providing an "E" as input to the electronic device 300. Immediately after this key press, the user's left hand is moving away from the key and back to the left thumb position 369. In addition, the right thumb is moving from the right thumb position 367 towards the EI key to enter an "I" into the electronic device. Thus, by performing real time temporal analysis and monitoring the position of a user's fingers in temporally adjacent images captured by the camera, activation detection software can provide an indication to keyboard interpretation routines, as to the character value to be assigned to a key activation.

In another embodiment, the "camera" operates by detecting infrared electromagnetic (EM) radiation vis-à-vis visible light spectrum EM. The use of infrared versus visible light EM allows for similar processing as that listed above with respect to the visible light EM. It provides an added advantage of allowing the present invention to work in low light situations where the quality of images available provided by a visible light EM camera is potentially reduced beyond usability.

Figure 8:
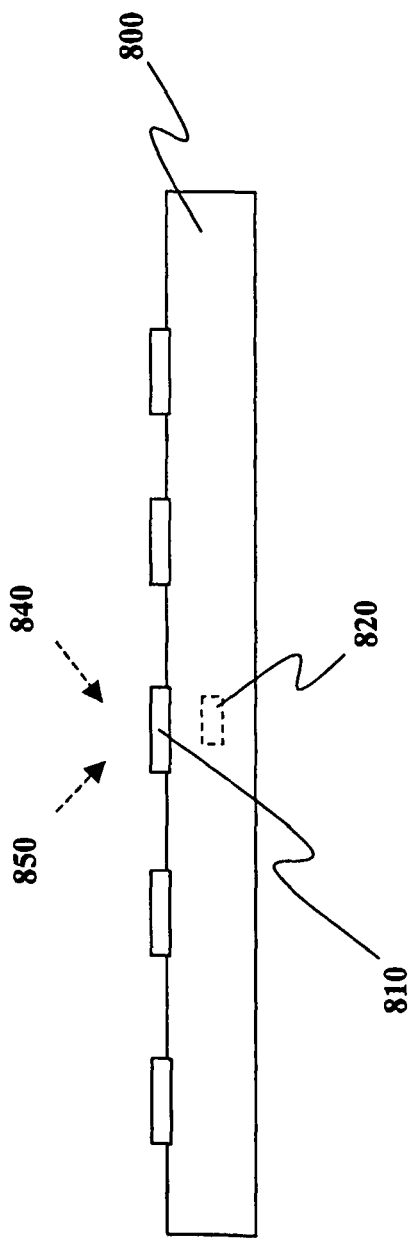
FIG. 8 illustrates an electronic device containing a motion detector in the form of a Micro-ElectroMechanical Systems (MEMS) accelerometer.

In another embodiment, motion detectors are utilized as activation detection hardware for aiding in determining character values to be assigned to key activations. FIG. 8 illustrates an electronic device 800 containing a motion detector in the form of a Micro-ElectroMechanical Systems (MEMS) accelerometer 820. In this embodiment, as a user activates a key 810, motions associated with this activation are detected by the accelerometer 820. For example, as a user activates key 810 with a finger from the right hand, there will be a right to left motion 840 in the key activation causing the movement of the body 800. This movement can be detected by accelerometer 820 and this information can be utilized by activation detection software to associate one character value with the key activation. Similarly, when a finger from the left hand is used to activate key 810, a left to right motion 850 is detected.

This results in the ability to associated a different character value with the key activation.

Figure 9:
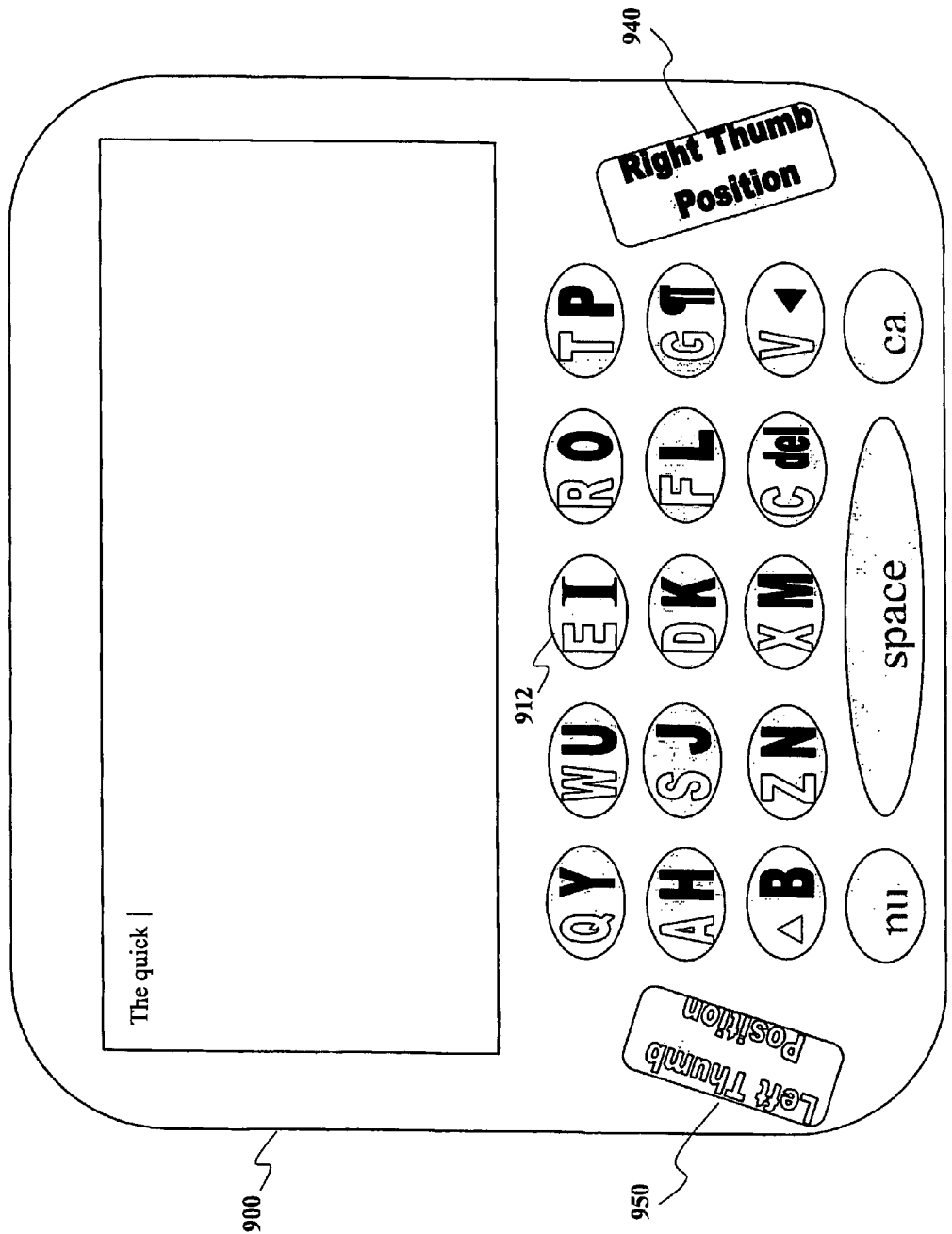
FIG. 9 illustrates a mobile device containing terminating hand member sensors, in accordance with one embodiment.

In another embodiment, terminating hand member sensors are utilized as activation detection hardware. Refer now to FIG. 9, wherein an embodiment compatible with such an implementation is shown. In this embodiment, two terminating hand members in the form of thumbs are used in providing input to electronic device 900, as previously discussed. In this embodiment, sensors are in place at the right thumb 940 and left thumb 950 idle positions of electronic device 900. These sensors detect when a thumb in proximity to its idle position. When key 912 is activated, proximity of a thumb to its home position can be used to provide an indicia of the assigned character value. For example, assume that left thumb position sensor 950 indicates that the left thumb is near its idle position when key 912 is activated. By implication an assumption can be made that the right thumb was used to activate key 912 and an "I" is input to electronic device 900.

In other embodiments, combinations of these methods are utilized to determine the assigned character values for key inputs. For example, in one embodiment, pressure sensors are used on combination with a camera to determine the assigned character value for various key activations.

Referring again to FIG. 3, recall that, in one embodiment, a set of character values on each key are back lit when it is determined which set of character values are to be assigned for input upon key activation. FIG. 10A illustrates a key 1010 defined with multiple character values to be associated with the key 1010, in accordance with one embodiment. The key 1010 has two lenses 1020 1030 through which light can pass. Both lenses of the key are in the shape of a character. The character shapes represent the multiple character values to be associated with the key 1010. In this embodiment, when it is determined by the activation detection logic which character value is to be associated with key activations, the appropriate character values are backlit on the keys. Thus, as shown in FIG. 10B, if it is determined that a terminating hand member from a left hand is to used to activate a key, the "Q" is backlit indicating that it is to be associated with the keys activation.

Utilizing the described method for allowing the overlaying of input keys of an electronic device, there may be occasions where an incorrect interpretation of input assignments is performed. For example, each user has their own personal usage traits and it may be that a particular user's hand motions are such that the activation detection logic incorrectly associates character values with key activations. In such cases, an ability to recover from this situation is desirable.

Refer again to FIG. 10B. As previously mentioned, if it is determined that a terminating hand member from a user's left hand is to activate a key, the "Q" is backlit indicating that it is to be associated with the key's activation. In order to compensate for the possibility that this association may have been an incorrect determination, in one embodiment, after a period of time where an association has been made, if there is no activation, the activation detection logic will associate the "Y" value with the key activation. This will be accompanied by a change in the backlighting, as shown in FIG. 10C.

Thus, a method for utilizing activation detection mechanisms for determining input character values from keys is disclosed.

What is claimed is:

1. An apparatus, comprising:
    a body;
    a keyboard upon said body including at least one key, the keyboard configured to cause a first function to be performed on activation of the key by physical contact with a terminating hand member of a user's right hand and to cause a second different function to be performed on activation of the key by physical contact with a terminating hand member of the user's left hand; and
    a detection mechanism, including one or more touch sensitive sensors and associated logic, configured to:
        detect one or more changes in physical contact between the body and either the user's right hand, the user's left hand, or both, based at least in part on change sensed by the one or more touch-sensitive sensors;
        in response to detecting the one or more changes in physical contact, determine which one of the user's two hands will be used to activate the key; and
        in response to the determining, assign one of the first function or the second function to the activation of the key.

2. The apparatus of claim 1, wherein said one or more touch-sensitive sensors comprise at least one terminating hand member proximity sensor.

3. The apparatus of claim 2, wherein said terminating hand member sensor is configured to detect that a detected terminating hand member is in a non-use position due to the detected terminating hand member being in proximity to the terminating hand member proximity sensor.

4. The apparatus of claim 2, wherein said terminating hand member proximity sensor is configured to detect that a detected terminating hand member has moved from a non-use position due to the detected terminating hand member moving away from proximity to the terminating hand member proximity sensor.

5. The apparatus of claim 1, wherein said touch-sensitive sensor comprises at least one pressure sensor configured to detect an increase in pressure on the body by either the user's left hand, the user's right hand, or both.

6. The apparatus of claim 1, wherein said at least one pressure sensor is configured to detect an increased inward pressure on a side of said body, wherein the processor is configured to determine the right-to-left or left-to-right movements of the user's terminating hand members based at least in part on such increased inward pressure on the side of the body.

7. The apparatus of claim 1, wherein the apparatus is a selected one of a wireless mobile phone and a personal digital assistant.

8. An apparatus comprising:
    a body;
    a keyboard upon said body including a key, the keyboard configured to cause a first function to be performed on activation of the key by physical contact with a terminating hand member of a user's right hand and to cause a different second function to be performed on activation of the key by physical contact with a terminating hand member of the user's left hand; and
    at least one pressure sensor and associated logic, configured to
        detect an increase in pressure on the body by either the user's right hand, the user's left hand, or both
        in response to detecting the detected increase in pressure, determine which one of the user's two hands will be used to activate the key; and
        in response to the determining, assign one of the first function or the second function to the activation of the key.

9. The apparatus of claim 8, wherein said at least one pressure sensor configured to detect an increased inward pressure on a side of said body.

10. The apparatus of claim 9, wherein the processor is configured to determine the right-to-left or left-to right movements of the user's terminating hand members based at least in part on such increased inward pressure on the side of the body.

11. An apparatus, comprising:
   a body;
   a keyboard upon said body including at least one key, the keyboard configured to cause a first function to be performed on activation of the key by physical contact with a terminating hand member of a user's right hand and to cause a second different function to be performed on activation of the key by physical contact with a terminating hand member of the user's left hand; and
   at least one touch-sensitive sensor and associated logic configured to:
      detect, on a touch-sensitive basis, that a detected terminating hand member has moved from a non-use position due to the detected terminating hand member moving away from proximity to the terminating hand member proximity sensor;
      in response to detecting that the detected terminating hand member has moved from a non-use position, determine which one of the user's two hands will be used to activate the key; and
      in response to the determining, assign one of the first function or the second function to the activation of the key.

* * * * *